United States Patent
Bodas et al.

(10) Patent No.: US 9,857,858 B2
(45) Date of Patent: Jan. 2, 2018

(54) MANAGING POWER CONSUMPTION AND PERFORMANCE OF COMPUTING SYSTEMS

(75) Inventors: Devadatta V. Bodas, Federal Way, WA (US); John H. Crawford, Saratoga, CA (US); Alan G. Gara, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,817

(22) PCT Filed: May 17, 2012

(86) PCT No.: PCT/US2012/038405
§ 371 (c)(1),
(2), (4) Date: Jun. 24, 2014

(87) PCT Pub. No.: WO2013/172843
PCT Pub. Date: Nov. 21, 2013

(65) Prior Publication Data
US 2015/0169026 A1  Jun. 18, 2015

(51) Int. Cl.
G06F 1/26 (2006.01)
G06F 1/32 (2006.01)

(52) U.S. Cl.
CPC .......... G06F 1/3206 (2013.01); G06F 1/3209 (2013.01); G06F 1/3234 (2013.01)

(58) Field of Classification Search
CPC ..... G06F 1/3206; G06F 1/3209; G06F 1/3234
(Continued)

(56) References Cited

U.S. PATENT DOCUMENTS

| 6,745,335 B1 | 6/2004 | Kusano |
| 7,111,179 B1 | 9/2006 | Girson et al. |

(Continued)

FOREIGN PATENT DOCUMENTS

| CN | 101231552 A | 7/2008 |
| CN | 101794169 A | 8/2010 |

(Continued)

OTHER PUBLICATIONS

International Search Report and Written Opinion received for PCT Patent Application No. PCT/US2012/038405, dated Feb. 28, 2013, 3 pages.
CN Search Report, CN Reference No. CPEL1453671P, dated Jun. 21, 2016, 8 pages.

*Primary Examiner* — Robert Cassity
(74) *Attorney, Agent, or Firm* — International IP Law Group, P.L.L.C.

(57) ABSTRACT

A method and system for managing power consumption and performance of computing systems are described herein. The method includes monitoring an overall power consumption of the computing systems to determine whether the overall power consumption is above or below an overall power consumption limit, and monitoring a performance of each computing system to determine whether the performance is within a performance tolerance. The method further includes adjusting the power consumption limits for the computing systems or the performances of the computing systems such that the overall power consumption is below the overall power consumption limit and the performance of each computing system is within the performance tolerance.

24 Claims, 11 Drawing Sheets

(58) Field of Classification Search
USPC .......................................................... 713/320
See application file for complete search history.

(56) References Cited

U.S. PATENT DOCUMENTS

| | | | |
|---|---|---|---|
| 7,143,300 B2 | 11/2006 | Potter et al. | |
| 8,001,403 B2 | 8/2011 | Hamilton et al. | |
| 2005/0138438 A1 | 6/2005 | Bodas | |
| 2007/0300084 A1* | 12/2007 | Goodrum | G06F 1/3203 713/300 |
| 2009/0106571 A1* | 4/2009 | Low | G06F 9/4856 713/310 |
| 2009/0235097 A1* | 9/2009 | Hamilton | G06F 1/3203 713/320 |
| 2009/0240964 A1* | 9/2009 | Pfeiffer | G06F 1/3209 713/320 |
| 2011/0072293 A1* | 3/2011 | Mazzaferri | G06F 1/3203 713/340 |
| 2011/0213993 A1* | 9/2011 | Greenhalgh | G06F 1/3203 713/320 |
| 2012/0226922 A1* | 9/2012 | Wang | G06F 1/3203 713/320 |

FOREIGN PATENT DOCUMENTS

| | | |
|---|---|---|
| CN | 102099790 A | 6/2011 |
| WO | 2006/007146 A2 | 1/2006 |

\* cited by examiner

200

300

400

500

600

700

MANAGING POWER CONSUMPTION AND PERFORMANCE OF COMPUTING SYSTEMS

TECHNICAL FIELD

The present invention relates generally to the management of the operation of multiple computing systems. More specifically, the present invention relates to the simultaneous management of power consumption and performance characteristics of multiple computing systems.

BACKGROUND ART

In many cases, a group of computing systems within a data center is allocated a specific power budget, e.g., an overall power consumption limit. To maintain the overall power consumption below the power budget at the datacenter level, most servers hosted in the datacenter are provided with their own power budget. These servers include a technology that continuously monitors power consumed by the server. When such power consumption exceeds the given power budget, the server performance may be scaled back, or throttled, in order to reduce the power below the power budget. Even for identically configured, i.e., homogeneous, computing systems running identical workloads, the power consumed by the computing systems may vary. This is mainly due to variations in characteristic of components within the computing systems and environmental conditions. Thus, the performances of the homogeneous computing systems subjected to an identical power budget may vary significantly. For example, for a group of 10,000 homogeneous computing systems with an identical power budget, some number of the computing systems may not be subjected to any throttling, while others may be throttled by as much as 20%.

In some cases, computation for a workload may occur in more than one computing system. In such cases, the workload may be distributed across multiple computing systems. These computing systems usually communicate with each other or with a central controller to exchange information, synchronize information, or maintain the integrity of the workload. Differences in performances between the computing systems caused by the power budgets of the computing systems may result in multiple issues. For example, in a distributed computing environment, there may be only one computing system for which the performance was throttled by 20% in order to meet the power budget at the system level. However, in order to maintain adequate synchronization, the performances of the aggregate might also be throttled by 20% if the computing systems need to wait on completion of sub-tasks. As a second example, previous experience has shown that small variations in the performances of individual computing systems can contribute to large performance variations of the aggregate. This led to efforts to minimize the variation between computing systems for performing various operations, such as OS tasks, interrupts, background tasks, or the like. Thus, many computing systems may be operating at a lower performance than the performance that is allowed by their power budgets.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
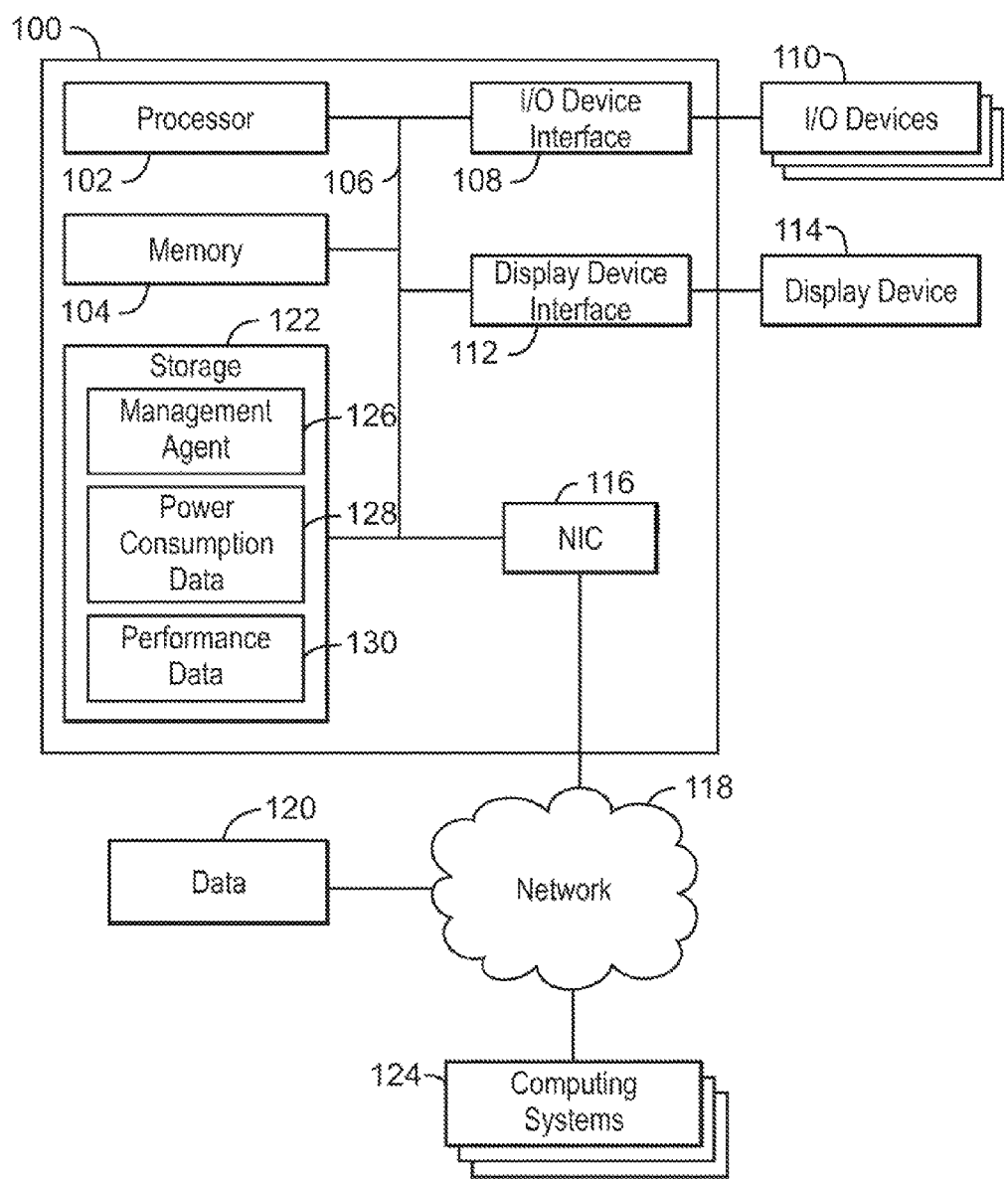
FIG. 1 is a block diagram of a computing system that may be used to implement the techniques for managing power consumption and performance of computing systems described herein.

As discussed above, embodiments described herein relate to the simultaneous management of power consumption and performance characteristics of multiple computing systems. Such embodiments may allow for the maintenance of an overall power consumption of a group of computing systems at an acceptable level, while maintaining the performances of the computing systems within a specified performance tolerance. In some embodiments, maintaining the performances of the computing systems within the specified performance tolerance ensures that all of the computing systems are operating at a nearly uniform performance level and, thus, will have similar completion times when executing similar workloads.

As used herein, the term "performance" refers to a response of a computing system during and after execution of a particular workload. In various embodiments, the performance of a computing system is quantified according to a specific performance metric. The performance metric may be defined according to input from a user of the computing device via a user interface. The performance metric may be based on specific parameters. Such parameters may include, for example, an average frequency, a completion time for a particular workload, a responsiveness of the system, a frame rate, a number of transactions completed, a rate of completion, or a rate of communication, e.g., bandwidth, among others. In addition, the performance metric may be based on multiple individual parameters, or may be based on a statistical operation, e.g., a mean, of multiple parameters.

The embodiments described herein may be implemented within a data center including multiple computing systems. In various embodiments, the computing systems within the data center are homogeneous computing systems with identical hardware and software configurations. However, the computing systems within the data center may also be heterogeneous computing systems with disparate hardware and software configurations.

Embodiments described herein may be used to manage the power consumption and performance characteristics of the computing systems based on particular workloads being executed by the computing systems. In addition, embodiments described herein may be particularly useful for data centers executing high performance computing (HPC) operations for which small differences between the completion times of related workloads by the various computing systems may have a large impact on the overall operation of the data center.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used to implement the techniques for managing power consumption and performance of computing systems described herein. The computing device 100 may be, for example, a server, laptop computer, desktop computer, tablet computer, or mobile device, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The instructions that are executed by the processor 102 may be used to implement a procedure that includes managing the power consumption and performance characteristics of any number of computing systems.

The processor 102 may be connected through a bus 106 to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

A network interface controller (NIC) 116 may be adapted to connect the computing device 100 through the bus 106 to a network 118. The network 118 may be a wide area network (WAN), local area network (LAN), or the Internet, among others. Through the network 118, the computing device 100 may access data 120. The computing device 100 may also download any of the data 120 and store the data 120 within a storage device 122 of the computing device 100.

Through the network 118, the computing device 100 may be communicably coupled to a number of computing systems 124. In various embodiments, the computing systems 124 are included within a distributed computing environment. Further, in some embodiments, the computing systems 124 are included within a data center. The computing systems 124 may be servers, laptop computers, desktop computers, tablet computers, mobile devices, or the like.

The storage device 122 can include a hard drive, an optical drive, a thumbdrive, an array of drives, or any combinations thereof. The storage device 122 may include a management agent 126 that is configured to manage the operation of the computing systems 124. For example, the computing device 100 may be a data center management system, and the management agent 126 may be a data center management agent that is configured to control the power consumptions and the performances of the computing systems 124. The management agent 126 may manage the operation of the computing systems 124 using power consumption data 128 and performance data 130 received from any of the computing systems 124 via the network 118. In various embodiments, the management agent 126 is any type of application or program that is configured to perform such management functions.

Each of the computing systems 124 may include one or more local management agents (not shown), which may be used to directly control the operation of the computing systems 124 based on input from the management agent 126 within the computing device 100. Such local management agents may include node management agents (not shown) and component management agents (not shown), as discussed further with respect to FIG. 2.

It is to be understood that the block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
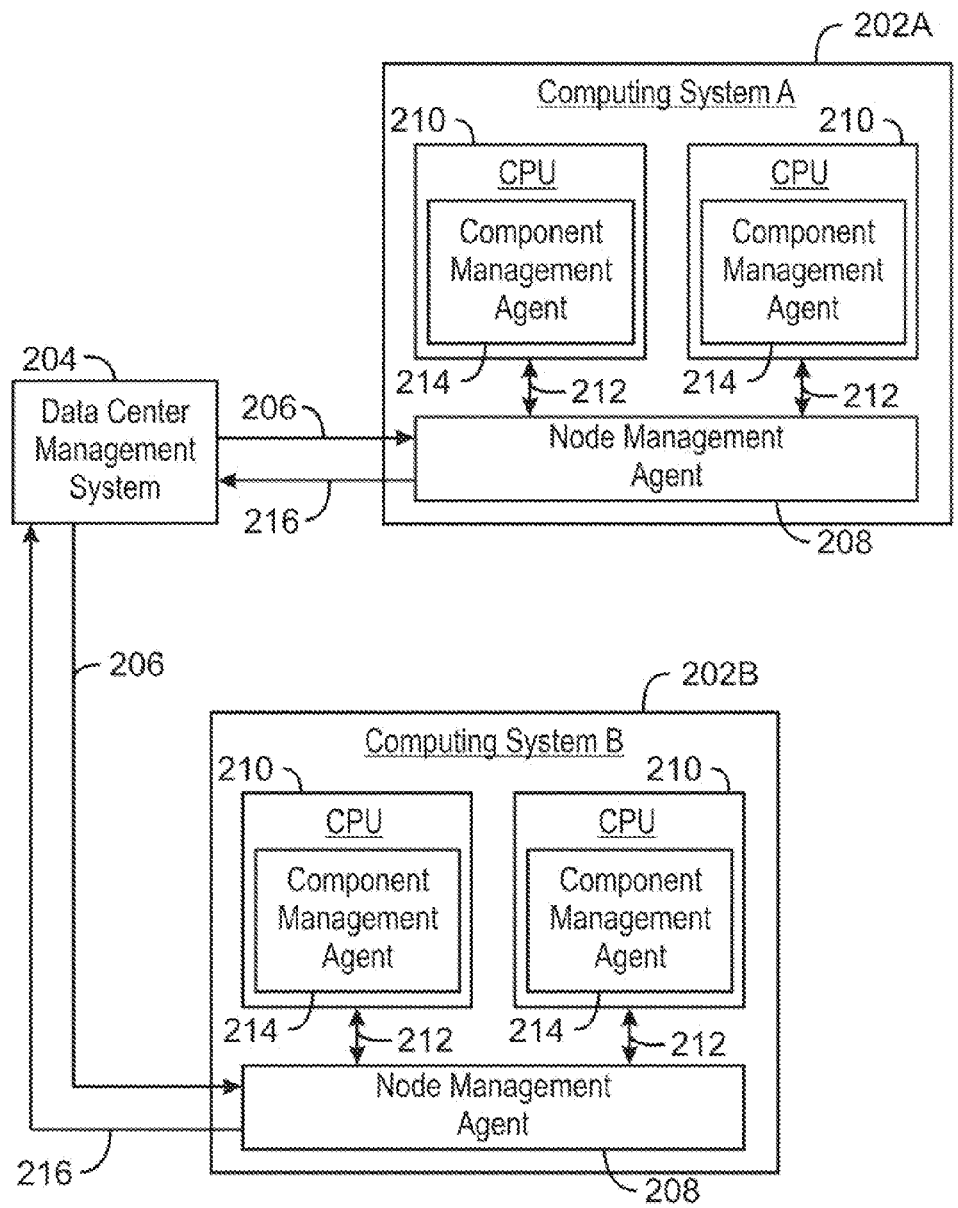
FIG. 2 is a block diagram of a computing environment that may be used in accordance with embodiments.

FIG. 2 is a block diagram of a computing environment 200 that may be used in accordance with embodiments. The computing environment 200 may be a distributed computing environment, such as a distributed data center. The computing environment 200 may include a number of computing systems 202, such as, for example, the computing system A 202A and the computing system B 202B shown in FIG. 2. The computing systems 202 may be any types of computing systems that are capable of executing the techniques described herein. For example, the computing systems 202 may be servers, laptop computers, desktop computers, tablet computers, mobile devices, or the like. In various embodiments, the computing systems 202 are homogeneous, meaning that all of the computing systems 202 include identical hardware and software configurations. However, in some embodiments, the computing systems 202 are heterogeneous, meaning that the computing systems 202 include disparate hardware or software configurations.

The computing environment 200 may also include a data center management system 204. The data center management system 204 may include a data center management agent (not shown). The data center management agent may be a hardware or software manageability agent, or may be a host operating system (OS) or a virtualized OS. In some embodiments, the data center management system 204 is the computing device 100 described above with respect to FIG. 1. The data center management system 204 may be configured to monitor and manage the operation of the computing systems 202. Further, in some embodiments, each computing system 202 may include a data center management system 204 that resides directly within the computing system 202.

In various embodiments, the data center management system 204 monitors the power consumption by each computing system 202 within the computing environment 200. The data center management system 204 may use the power consumption information to dynamically determine a power consumption limit for each computing system 204 such that an overall power consumption limit for the computing environment 200 is not exceeded. For example, if the computing systems 202 are servers within a data center, the power consumption limits for the servers may be determined such that an overall power consumption limit for the entire rack of servers is not exceeded.

In addition, the data center management system 204 may monitor the performance of each computing system 202. The performances of the computing systems 202 may be defined according to any of a number of performance metrics, as discussed above. The data center management system 204 may use the performance information to determine desired performances for the computing systems, as well as a performance tolerance for the computing systems 204. The performance tolerance may define a limit on the amount of performance variation between the computing systems 202.

The data center management system 204 may communicate the power consumption limit and the performance information to a node management agent 208 within each of the computing systems 202, as indicated by arrows 206. In various embodiments, the data center management system 204 sends the power consumption limits, the desired performances, and the performance tolerance to the node management agents 208 within each of the computing systems 202 via a network, such as a WAN, LAN, or the Internet.

The node management agent 208 may be any type of application or program that is configured to perform platform level management functions for the computing system 202. In addition, the node management agent 208 may be a system or chassis that has multiple blades within the computing system 202. Further, the node management agent 208 may be an internal system agent, a basic input/output system (BIOS), firmware, or an OS.

In various embodiments, the node management agent 208 within each of the computing systems 202 may determine socket level power consumption limits for the socket of each central processing unit (CPU) 210 within the computing system 202. The node management agent 208 may communicate the corresponding socket level power consumption limit, as well as the performance tolerance, to each central processing unit (CPU) 210 with the computing system 204, as indicated by arrow 212.

Each CPU 210 may include a component management agent 214 that is configured to dynamically maintain the power consumption of the CPU 210 at or below the socket level power consumption limit. The component management agent 214 may be any type of application or program that is configured to implement policies for managing the power consumption of the CPU 210. For example, the component management agent 214 may be control hardware, software, or firmware that is part of the CPU 210 or an input/output controller. In addition, the component management agent may include one or more integrated units. The component management agent 214 may be configured to maintain the performance of the CPU 210 within the performance tolerance.

The component management agents 214 within each of the computing systems 202 may communicate socket level power consumption and performance information to the node management agent 208, as indicated by the arrow 212.

The node management agent 208 may use the socket level power consumption and performance information to determine a platform level power consumption and performance of the computing system 202. In addition, the node management agent 208 may communicate the platform level power consumption and performance of the computing system 202 to the data center management system 204, as indicated by arrow 216. In some embodiments, the data center management system 204 includes an aggregator (not shown) that is configured to compile the platform level power consumption and performance information received from the node management agents 208 of the computing systems 202.

In various embodiments, the data center management system 204 uses the platform level power consumption and performance information to manage the operation of the computing systems 202. For example, the data center management system 204 may adjust the power consumption limits for the computing systems 202 based on whether the overall power consumption of the computing systems 202 is above or below the overall power consumption limit. In addition, the data center management system 204 may adjust the performances of the computing systems 202 based on the platform level power consumption and performance information.

The data center management system 204 may manage the power consumption and the performance of each computing system 202 according to the method 300 discussed below with respect to FIG. 3. In addition, the data center management system 204 may utilize any of a number of specific policies, e.g., methods 400-1000, discussed with respect to FIGS. 4-10 to manage the power consumption and the performance of each computing system 202.

It is to be understood that the block diagram of FIG. 2 is not intended to indicate that the computing environment 200 is to include all of the components shown in FIG. 2. Further, the computing environment 200 may include any number of additional components not shown in FIG. 2, depending on the details of the specific implementation. For example, multiple data center management systems 204 may be included within the computing environment 200. In addition, multiple node management agents 208 may be included within one computing system 202, or multiple component management agents 214 may be included within one socket. In such instances, one of the agents may behave as a master or owner of the other agents. Such ownership may be fixed, or may change for a variety of reasons.

In various embodiments, communications between the data center management system 204 and any of the node management agents 208, as well as communications between any of the node management agents 208 and the corresponding component management agents 214, may be facilitated via well-defined protocols. For example, such communications may be transmitted via hardware signals or software mechanisms. In addition, such communications may be transmitted via the network.

Figure 3:
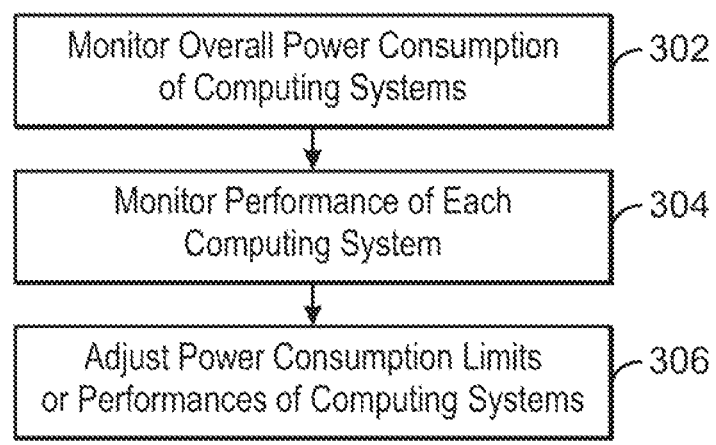
FIG. 3 is a process flow diagram showing a method for managing power consumption and performance of computing systems.

FIG. 3 is a process flow diagram showing a method 300 for managing power consumption and performance of computing systems. The computing systems may include, for example, the computing device 100 and the computing systems 124 discussed above with respect to FIG. 1, or the computing systems 202 discussed above with respect to FIG. 2. In various embodiments, the computing systems are homogeneous computing systems with identical hardware and software configurations. Further, the computing systems may include any number of computing systems within a data center, such as, for example, one or more racks of servers within a data center.

In addition, the method 300 may be executed via a data center management agent within a remote computing system. The data center management agent may include, for example, the management agent 126 discussed above with respect to FIG. 1, or the data center management system 204 discussed above with respect to FIG. 2.

In various embodiments, the method 300 is used to maintain an overall power consumption of multiple computing systems below a power budget, e.g., an overall power consumption limit. In addition, the method 300 may be used to maintain the performances of the computing systems within a specified performance tolerance. This may ensure that all of the computing systems are operating at a similar responsiveness level, frame rate, frequency, completion rate, bandwidth, or the like, depending on the specific performance metric that is used to define the performance of the computing systems.

According to the method 300, an overall power consumption limit for the computing systems may be determined. In some embodiments, the overall power consumption limit is automatically determined by the data center management agent according to the available amount of power. In other embodiments, the overall power consumption limit is determined in response to input from a user of the computing system on which the data center management agent resides.

The method begins at block 302, at which an overall power consumption of the computing systems is monitored to determine whether the overall power consumption is above or below the overall power consumption limit. In some embodiments, the overall power consumption is periodically monitored by the data center management agent. This may be performed, for example, by receiving information relating to the power consumption and performance of each computing system from the corresponding node management agent. Such information may be compiled within an aggregator of the data center management agent, and may be used to determine whether overall power consumption of the computing systems is above or below the overall power consumption limit.

At block 304, a performance of each computing system is monitored to determine whether the performance of each computing system is within the performance tolerance. The performances of the computing systems may be determined according to any of a variety of techniques, depending on the specific performance metric that is used to define the performances.

At block 306, the power consumption limits for the computing systems or the performances of the computing systems, or both, are adjusted such that the overall power consumption is below the overall power consumption limit and the performance of each computing system is within the performance tolerance. In various embodiments, the adjustments to the power consumption limits and the performances of the computing systems are determined according to any of the methods 400-1000 described below with respect to FIGS. 4-10.

In the case of homogeneous computing systems, the performances of the computing systems may be uniformly adjusted such that the overall power consumption is below the power consumption limit. Thus, the computing systems may be operated at an identical performance.

In some embodiments, the power consumption limit for a computing system is sent from the data center management agent within a remote computing system to a node management agent within the computing system. The node management agent may be configured to maintain the power consumption of the computing system below the power consumption limit and the performance of the computing system within the performance tolerance. The node management agent may manage the power consumption and performance of the computing system by determining a socket level power consumption limit and a desired performance for the socket of each CPU within the computing system. In addition, a component management agent within each CPU socket may be configured to maintain the power consumption below the socket level power consumption limit and the performance within the performance tolerance.

It is to be understood that the process flow diagram of FIG. 3 is not intended to indicate the steps of the method 300 are to be executed in any particular order, or that all of the steps of the method 300 are to be included in every case. Further, any number of additional steps may be included within the method 300, depending on the details of the specific implementation.

Figure 4:
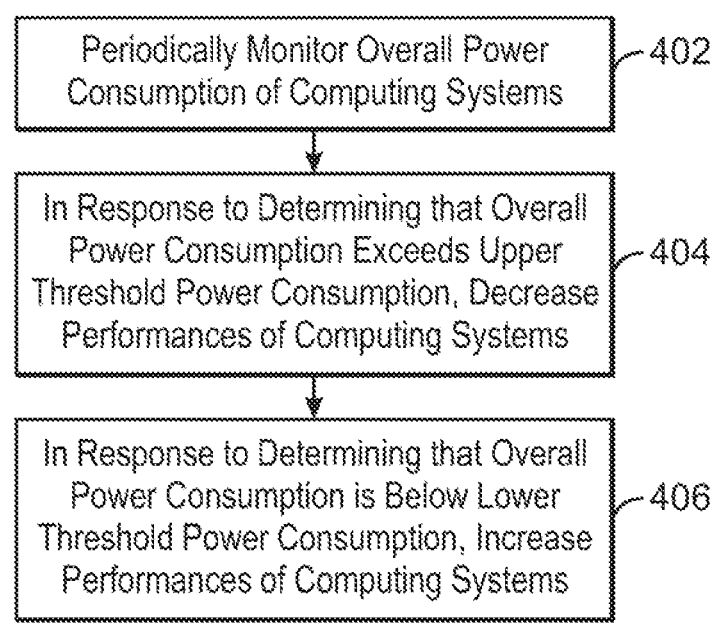
FIG. 4 is a process flow diagram showing a method for adjusting performances of the computing systems based on the overall power consumption of the computing systems.

FIG. 4 is a process flow diagram showing a method 400 for adjusting performances of the computing systems based on the overall power consumption of the computing systems. The method begins at block 402 with the periodic monitoring of the overall power consumption of the computing systems. In addition, upper and lower threshold power consumptions may be determined for the overall power consumption. Maintaining the overall power consumption below the upper threshold power consumption and above the lower threshold power consumption may ensure that the computing systems are operating efficiently.

At block 404, in response to determining that the overall power consumption exceeds the upper threshold power consumption, the performances of the computing systems are decreased. In various embodiments, the performances of the computing systems are decreased such that the overall power consumption is below the upper threshold power consumption. Further, if the computing systems are homogeneous, the performances of the computing systems may be decreased simultaneously and identically.

At block 406, in response to determining that the overall power consumption is below the lower threshold power consumption, the performances of the computing systems are increased. In various embodiments, the performances of the computing systems are increased such that the overall power consumption is above the lower threshold power consumption. Further, if the computing systems are homogeneous, the performances of the computing systems may be increased simultaneously and identically.

It is to be understood that the process flow diagram of FIG. 4 is not intended to indicate the steps of the method 400 are to be executed in any particular order, or that all of the steps of the method 400 are to be included in every case. Further, any number of additional steps may be included within the method 400, depending on the details of the specific implementation.

Figure 5:
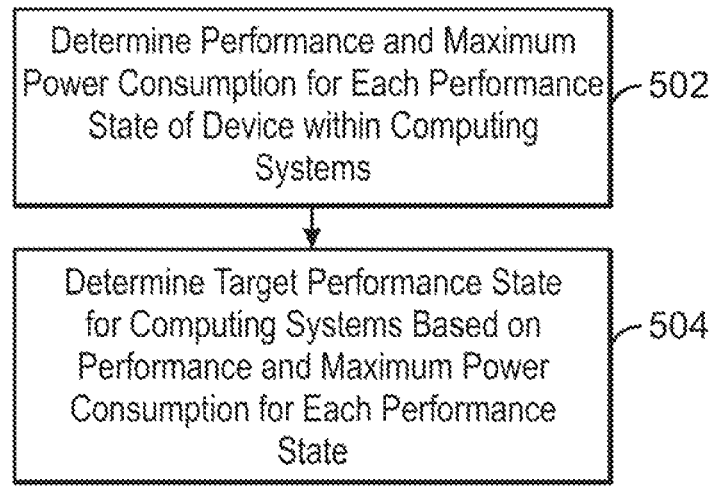
FIG. 5 is a process flow diagram showing a method for determining a target performance state for the computing systems.

FIG. 5 is a process flow diagram showing a method 500 for determining a target performance state for the computing systems. As used herein, the term "performance state" refers to a performance level of a particular computing system operating at a specific power consumption, or operating within a specific power consumption range.

The method begins at block 502, at which a performance and a maximum power consumption are determined for each performance state of a device within the computing systems. The device may be, for example, a processor that is included within each of the computing systems. In addition, the device may be an I/O device that is included within each of the computing systems. In some embodiments, the performance states of the device are analyzed to determine approximate performance states for the computing systems in general.

In various embodiments, the performance and the maximum power consumption for each performance state are determined from an Advanced Configuration and Power Interface (ACPI) performance state table. The ACPI performance state table is the industry standard for determining the power and performances characteristics of the specific device within the computing systems. For example, the performance states of the device may specify a frequency and a maximum power number for the particular device.

At block 504, a target performance state for the computing systems is determined based on the performance and the maximum power consumption for each performance state. The target performance state may be determined such that the overall power consumption is below the overall power consumption limit and the performances of the computing systems are within the performance tolerance. In addition, the performance states of the computing systems may be adjusted according to the target performance state. Because the computing systems are homogeneous, the performance states of the computing systems may be adjusted simultaneously and identically.

In various embodiments, if the overall power consumption exceeds the overall power consumption limit, the data center management agent may select a duty cycle to operate the computing systems between higher and lower performance states. The period of the duty cycle may be calculated according to the ratio of the theoretical power consumption at the original performance state to the theoretical power consumption at the target performance state. The period of duty cycle may also be calculated according to the ratio of measured power consumption at the original performance state to the measured power consumption at the target performance state.

It is to be understood that the process flow diagram of FIG. 5 is not intended to indicate the steps of the method 500 are to be executed in any particular order, or that all of the steps of the method 500 are to be included in every case. Further, any number of additional steps may be included within the method 500, depending on the details of the specific implementation.

Figure 6:
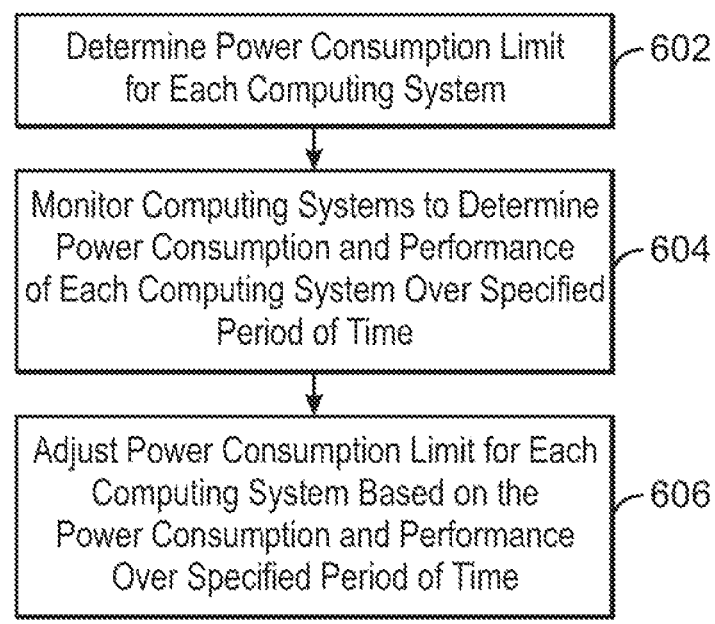
FIG. 6 is a process flow diagram showing a method for adjusting the power consumption limit for each computing system based on power consumption and performance data collected over a specified period of time.

FIG. 6 is a process flow diagram showing a method 600 for adjusting the power consumption limit for each computing system based on power consumption and performance data collected over a specified period of time. The method begins at block 602, at which a power consumption limit for each computing system is determined by dividing the overall power consumption limit by a total number of computing systems. In various embodiments, the computing systems that are utilized according to the method 600 are homogenous computing systems.

At block 604, the computing systems are monitored to determine a power consumption and a performance of each computing system over a specified period of time. The specified period of time may be automatically determined by the data center management agent, or may be determined by a user of the computing system on which the data center management agent resides.

At block 606, the power consumption limit for each computing system is adjusted based on the power consumption and the performance over the specific period of time. The power consumption limit for each computing device may be adjusted such that performances of the computing systems are maintained within the performance tolerance. In addition, the data center management agent may use any of a variety of techniques to calculate an appropriate adjustment to the power consumption limit for each computing device. For example, the power consumption limit may be increased or decreased such that the operation of the computing system is only altered by one performance state at a time. As another example, the power consumption limit may be increased or decreased based on calculations that are performed using the ACPI performance state table of the computing system.

It is to be understood that the process flow diagram of FIG. 6 is not intended to indicate the steps of the method 600 are to be executed in any particular order, or that all of the steps of the method 600 are to be included in every case. Further, any number of additional steps may be included within the method 600, depending on the details of the specific implementation.

Figure 7:
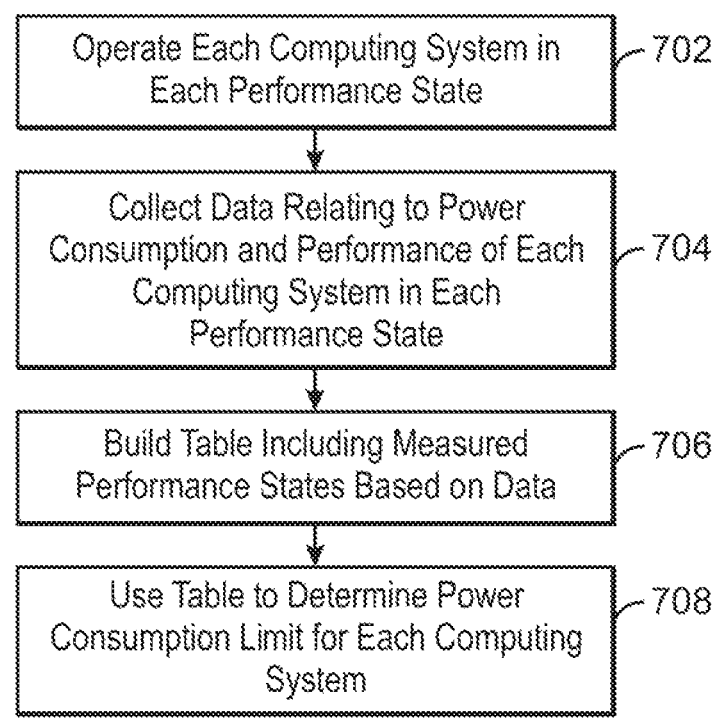
FIG. 7 is a process flow diagram showing a method for determining the power consumption limit for each computing system based on a table that is built using measured power consumption and performance data.

FIG. 7 is a process flow diagram showing a method 700 for determining the power consumption limit for each computing system based on a table that is built using measured power consumption and performance data. The method begins at block 702, at which each computing system is operated in each of a number of performance states. Each performance state may include a performance and a maximum power consumption.

At block 704, data relating to a power consumption and a performance of each computing system in each performance state is collected. Such power consumption and performance information may be collected at regular or irregular intervals.

At block 706, a table including measured performance states is built based on the data. Each of the measured performance states may include a measured performance and a measured average power consumption. The table may be more accurate than the ACPI performance state table, since the table is based on actual data collected from the computing systems.

At block 708, the table is used to determine the power consumption limit for each computing system. The power consumption limit may be determined such that the performance of the computing system is within the performance tolerance.

It is to be understood that the process flow diagram of FIG. 7 is not intended to indicate the steps of the method 700 are to be executed in any particular order, or that all of the steps of the method 700 are to be included in every case. Further, any number of additional steps may be included within the method 700, depending on the details of the specific implementation.

Figure 8:
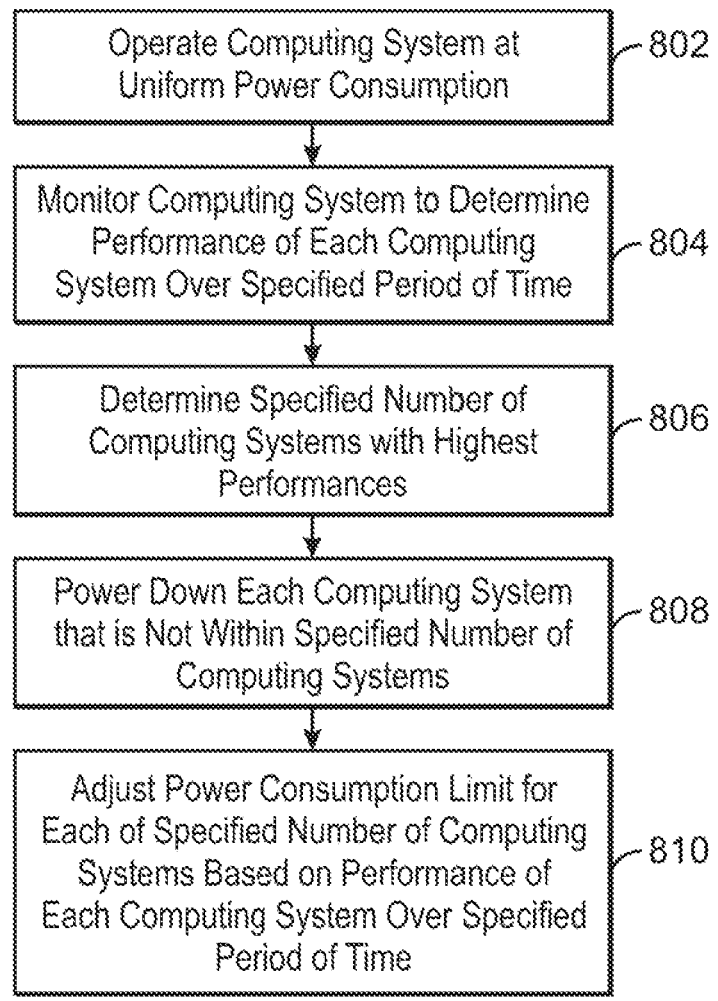
FIG. 8 is a process flow diagram showing a method for adjusting the power consumption limit for each computing system based on performance data collected during operation of the computing systems at a uniform power consumption.

FIG. 8 is a process flow diagram showing a method 800 for adjusting the power consumption limit for each computing system based on performance data collected during operation of the computing systems at a uniform power consumption. In various embodiments, the computing systems that are utilized according to the method 800 are homogenous computing systems. The method 800 may be performed for instances in which it is desirable to operate only a specified number of the computing systems with highest performances.

The method begins at block 802, at which the computing systems are operated at a uniform power consumption. The uniform power consumption may be determined by dividing the overall power consumption limit by a total number of computing systems.

At block 804, the computing systems are monitored to determine a performance of each computing system over a specified period of time. At block 806, a specified number of computing systems with highest performances are determined. At block 808, each computing system that is not within the specified number of computing systems with the highest performances is powered down.

At block 810, the power consumption limit for each of the specified number of computing systems is adjusted based on the performance of each computing system over the specific period of time. For example, because a number of the computing systems have been powered down, the power consumption limit for each of the specified number of computing systems may be increased. The power consumption limits for the computing systems may be determined such that the performance tolerance is not exceeded It is to be understood that the process flow diagram of FIG. 8 is not intended to indicate the steps of the method 800 are to be executed in any particular order, or that all of the steps of the method 800 are to be included in every case. Further, any number of additional steps may be included within the method 800, depending on the details of the specific implementation.

Figure 9:
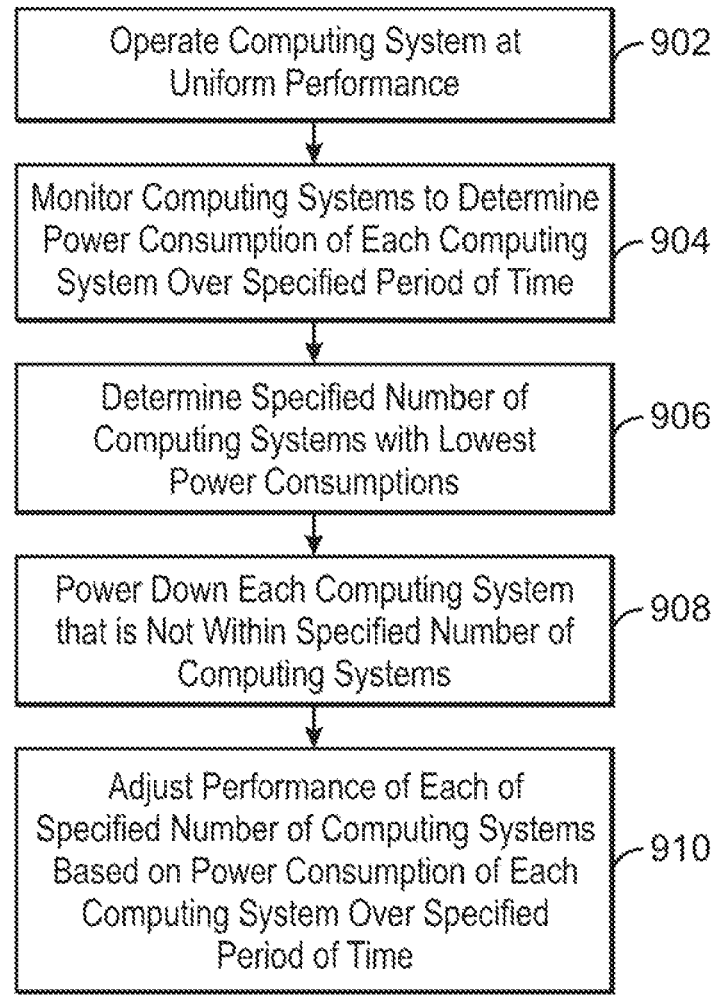
FIG. 9 is a process flow diagram showing a method for adjusting the performance of each computing system based on power consumption data collected during operation of the computing systems at a uniform performance.

FIG. 9 is a process flow diagram showing a method 900 for adjusting the performance of each computing system based on power consumption data collected during operation of the computing systems at a uniform performance. In various embodiments, the computing systems that are utilized according to the method 900 are homogenous computing systems. The method 900 may be performed for instances in which it is desirable to operate only a specified number of the computing systems with lowest power consumptions.

The method begins at block 902, at which the computing systems are operated at a uniform performance. The uniform performance may be determined using the ACPI performance state table for the computing systems. In addition, the uniform performance may be determined based on input from a user of the computing systems on which the data center management agent resides. The uniform performance may be determined such that the overall power consumption limit is not exceeded.

At block 904, the computing systems are monitored to determine a power consumption of each computing system over a specified period of time. At block 906, a specified number of computing systems with lowest power consumptions are determined. At block 908, each computing system that is not within the specified number of computing systems with the lowest power consumptions is powered down.

At block 910, the performance of each of the specified number of computing systems is adjusted based on the power consumption of each computing system over the specific period of time. For example, because a number of the computing systems have been powered down, the performance of each of the specified number of computing systems may be increased. However, the performances of the computing systems may be determined such that the overall power consumption limit is not exceeded.

It is to be understood that the process flow diagram of FIG. 9 is not intended to indicate the steps of the method 900 are to be executed in any particular order, or that all of the steps of the method 900 are to be included in every case. Further, any number of additional steps may be included within the method 900, depending on the details of the specific implementation.

Figure 10:
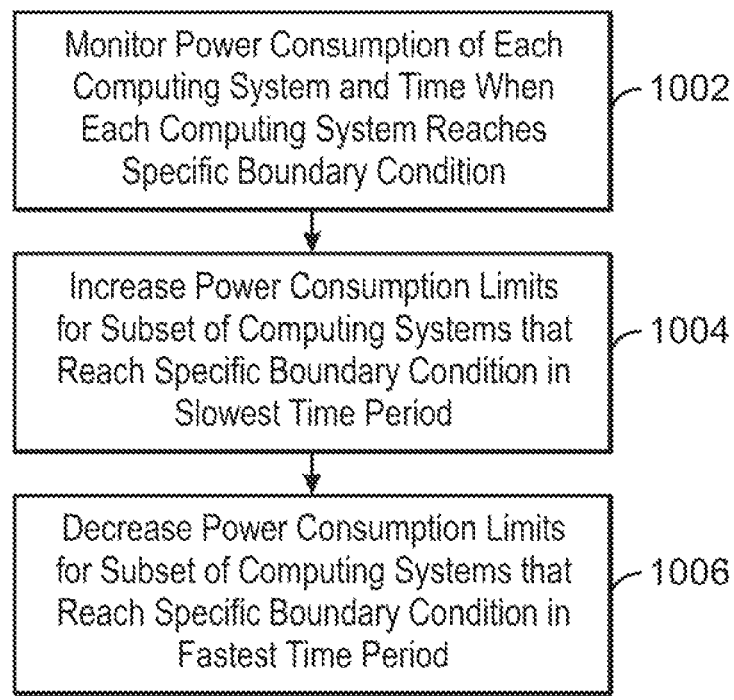
FIG. 10 is a process flow diagram showing a method for adjusting the power consumption limit for each computing system based on a time when the computing system reaches a specific boundary condition.

FIG. 10 is a process flow diagram showing a method 1000 for adjusting the power consumption limit for each computing system based on a time when the computing system reaches a specific boundary condition. According to the method 1000, the power consumption limit for each computing system is determined by dividing the overall power consumption limit by the total number of computing systems.

The method begins at block 1002, at which a power consumption of each computing system and a time when each computing system reaches a specific boundary condition are monitored. For example, each computing system may report to the data center management agent when it reaches the specific boundary condition during execution of computation, e.g., during the execution of a particular workload. The specific boundary condition may be, for example, a time at which synchronization of workloads across various computing systems is desired. In addition, the specific boundary condition may be a specific system call that is visible to all of the computing systems.

At block 1004, the power consumption limits for a subset of the computing systems that reach the specific boundary condition in a slowest time period are increased. At block 1006, the power consumption limits for a remaining number of the computing systems that reach the specific boundary condition in a fastest time period are decreased. This may ensure that computing systems with different performance characteristics finish execution of particular workloads at a similar time, e.g., within a certain time period.

It is to be understood that the process flow diagram of FIG. 10 is not intended to indicate the steps of the method 1000 are to be executed in any particular order, or that all of the steps of the method 1000 are to be included in every case. Further, any number of additional steps may be included within the method 1000, depending on the details of the specific implementation.

In various embodiments, any of the methods 400-1000 may be used in conjunction with one another. In other words, any of the methods 400-1000 may be executed in any order or in any types of combinations, depending on the details of the specific implementation. For example, the method 800 or 900 may be executed prior to the implementation of any of the other methods 400-700 or 1000.

The methods 300-1000 may be executed for any of a number of different types of computing systems. For example, the computing systems may be included within a HPC environment, or the computing systems may be supercomputers. In addition, the computing systems may include servers or other computing devices for implementing search engines or e-commerce stores, among others. Accordingly, the methods 300-1000 may be appropriately adjusted depending on the nature of the particular group of computing systems for which the methods 300-1000 are being executed.

Any of the methods 300-1000 may be executed at various points in time during the operation of the computing systems. For example, any of the methods 300-1000 may be executed while the computing systems are being built and configured, or during the boot-up of the computing systems using predetermined workloads. In such instances, the power consumption and performance data may be stored in volatile or non-volatile memory or in an external database, for example. Any of the methods 300-1000 may be executed on demand before actual work computation is performed. In such instances, the workloads may be preloaded or may be provided on-the-fly. Further, any of the methods 300-1000 may be continuously or periodically executed during operation of the computing systems.

Figure 11:
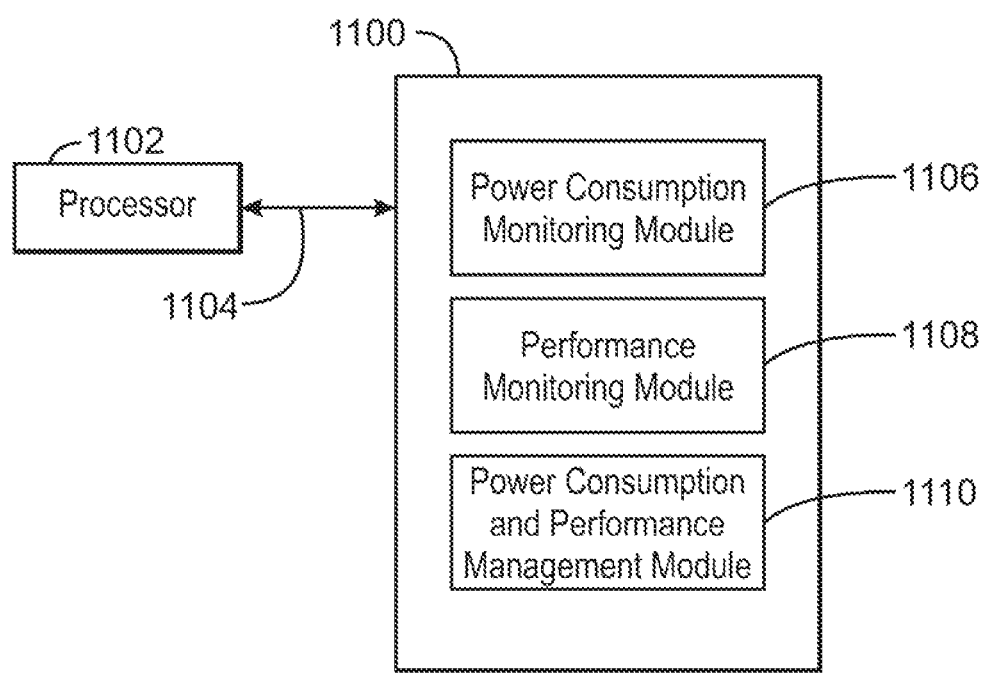
FIG. 11 is a block diagram showing a tangible, non-transitory computer-readable medium that stores code for managing power consumption and performance of computing systems.

FIG. 11 is a block diagram showing a tangible, non-transitory computer-readable medium 1100 that stores code for managing power consumption and performance of computing systems. The tangible, non-transitory computer-readable medium 1100 may be accessed by a processor 1102 over a computer bus 1104. Furthermore, the tangible, non-transitory, computer-readable medium 1100 may include code configured to direct the processor 1102 to perform the methods described herein.

The various software components discussed herein may be stored on the tangible, computer-readable medium 1100, as indicated in FIG. 11. For example, a power consumption monitoring module 1106 may be configured to determine the power consumptions of multiple computing systems, as well as an overall power consumption of the computing systems. A performance monitoring module 1108 may be configured to determine the performances of the computing systems. The performance monitoring module 1108 may also be configured to determine whether differences in the performances of the computing systems exceed a performance tolerance. Further, a power consumption and performance management module 1110 may be configured to adjust the power consumption limits and performances of the computing systems such that the overall power consumption limit and the performance tolerance are not exceeded.

It is to be understood that the block diagram of FIG. 11 is not intended to indicate that the tangible, non-transitory computer-readable medium 1100 is to include all of the components shown in FIG. 11. Further, any number of additional components not shown in FIG. 11 may be included within the tangible, non-transitory computer-readable medium 1100, depending on the details of the specific implementation.

Example 1

A method for managing power consumption and performance of computing systems is provided herein. The method includes monitoring an overall power consumption of the computing systems to determine whether the overall power consumption is above or below an overall power consumption limit, and monitoring a performance of each computing system to determine whether a performance is within a performance tolerance. The method further includes adjusting power consumption limits for the computing systems or performances of the computing systems such that the overall power consumption of the computing systems is below the overall power consumption limit and the performance of each computing system is within the performance tolerance.

The method may be executed via a data center management agent within a remote computing system. In addition, the power consumption limit for a computing system may be sent from the data center management agent within the remote computing system to a node management agent within the computing system. The node management agent may be configured to maintain a power consumption of the computing system below the power consumption limit and a performance of the computing system within the performance tolerance.

The computing systems may include homogeneous computing systems with an identical hardware configuration and an identical software configuration. The performances of the computing systems may be uniformly adjusted such that the computing systems are operating at an identical performance and the overall power consumption is below the overall power consumption limit.

The overall power consumption of the computing systems may be periodically monitored. In response to determining that the overall power consumption exceeds an upper threshold power consumption, the performances of the computing systems may be decreased such that the overall power consumption is below the upper threshold power consumption. In response to determining that the overall power consumption is below a lower threshold power consumption, the performances of the computing systems may be increased such that the overall power consumption is above the lower threshold power consumption.

A performance and a maximum power consumption for each performance state of a device within the computing systems may be determined from an Advanced Configuration and Power Interface (ACPI) performance state table. A target performance state for the computing systems may be determined based on the performance and the maximum power consumption for each performance state. The target performance state may be determined such that the overall power consumption is below the overall power consumption limit and the performances of the computing systems are within the performance tolerance.

A power consumption limit for each computing system may be determined by dividing the overall power consumption limit by a total number of computing systems. The computing systems may be monitored to determine a power consumption and a performance of each computing system over a specified period of time. The power consumption limit for each computing system may be adjusted based on the power consumption and the performance over the specific period of time. The power consumption limit for each computing device may be adjusted such that performances of the computing systems are maintained within the performance tolerance.

The computing systems may be operated at a uniform power consumption. The computing systems may be monitored to determine a performance of each computing system over a specified period of time. A specified number of computing systems with highest performances may be determined. Each computing system that is not within the specified number of computing systems with the highest performances may be powered down. The power consumption limit for each of the specified number of computing systems may be adjusted based on the performance of each computing system over the specific period of time.

The computing systems may be operated at a uniform performance. The computing systems may be monitored to determine a power consumption of each computing system over a specified period of time, and a specified number of computing systems with lowest power consumptions may be determined. Each computing system that is not within the specified number of computing systems with the lowest power consumptions may be powered down. A performance of each of the specified number of computing systems may be adjusted based on the power consumption of each computing system over the specific period of time.

Each computing system may be operated in each of a number of performance states, wherein each performance state includes a performance and a maximum power consumption. Data relating to a power consumption and a performance of each computing system in each performance state may be collected. A table including measured performance states may be built based on the data, wherein each of the measured performance states includes an average performance and an average power consumption. The table may be used to determine the power consumption limit for each computing system, wherein the power consumption limit is determined such that the performance of the computing system is within the performance tolerance.

A power consumption of each computing system and a time when each computing system reaches a specific boundary condition may be monitored. The power consumption limits for a subset of the computing systems that reach the specific boundary condition in a slowest time period may be increased. The power consumption limits for a remaining number of the computing systems that reach the specific boundary condition in a fastest time period may be decreased.

Example 2

A system for managing power consumption and performance of computing systems is provided herein. The system includes a data center management system configured to determine a platform level power consumption limit for each of a number of computing systems in a data center based on an overall power consumption limit and a performance tolerance for the computing systems. The system also includes the computing systems. Each computing system includes a node management agent configured to maintain a platform level power consumption of the computing system below the platform level power consumption limit by determining a socket level power consumption limit for each socket within a platform of the computing system. Each computing system also includes a number of component management agents, wherein each component management agent is configured to maintain the socket level power consumption limit for a corresponding socket within the computing system.

The performance tolerance may include a specified maximum difference in performances between the computing systems. In addition, the computing systems may be homogeneous computing systems with an identical hardware configuration and an identical software configuration.

The data center management system may be configured to determine a performance and a maximum power consumption for each performance state of a device within the computing systems from an Advanced Configuration and Power Interface (ACPI) performance state table. The data center management system may also be configured to determine a target performance state for the computing systems based on the performance and the maximum power consumption for each performance state. The target performance state may be determined such that the overall power consumption is below the overall power consumption limit and the performances of the computing systems are within the performance tolerance.

The data center management system may be configured to determine a power consumption limit for each computing system by dividing the overall power consumption limit by a total number of computing systems and monitor the computing systems to determine a power consumption and a performance of each computing system over a specified period of time. The data center management system may also be configured to adjust the power consumption limit for each computing system based on the power consumption and the performance over the specific period of time, wherein the power consumption limit for each computing device is adjusted such that performances of the computing systems are maintained within the performance tolerance.

The data center management system may be configured to operate each computing system in each of a number of performance states, wherein each performance state comprises a performance and a maximum power consumption, and collect data relating to a power consumption and a performance of each computing system in each performance state. The data center management system may also be configured to build a table including measured performance states based on the data, wherein each of the measured performance states includes an average performance and an average power consumption. Further, the data center management system may be configured to use the table to determine the power consumption limit for each computing system, wherein the power consumption limit is determined such that the performance of the computing system is within the performance tolerance.

The data center management system may be configured to adjust the platform level power consumption limit for each of the computing systems such that the overall power consumption of the computing systems is less than the overall power consumption limit and the performances of the computing systems are within the performance tolerance.

Example 3

At least one machine readable medium is provided herein. The machine readable medium includes instructions stored therein that, in response to being executed on a computing device, cause the computing device to monitor a combined power consumption of the computing systems to determine whether the combined power consumption is above or below a combined power consumption limit, and to monitor differences between performances of the computing systems to determine whether the differences are above or below a performance difference limit. Further, the instructions cause the computing device to adjust the power consumption limit for the computing systems or the performances of the computing systems such that the combined power consumption is below the combined power consumption limit and the differences between the performances are below the performance difference limit.

The computing system may include homogeneous computing systems with an identical hardware configuration and an identical software configuration. The instructions may cause the computing device to determine a performance and a maximum power consumption for each performance state of a device within the computing systems from an Advanced Configuration and Power Interface (ACPI) performance state table. The instructions may also cause the computing device to determine a target performance state for the computing systems based on the performance and the maximum power consumption for each performance state. The target performance state may be determined such that the combined power consumption is below the combined power consumption limit and the differences between the performances are below the performance difference limit.

The instructions may cause the computing device to determine a power consumption limit for each computing system by dividing the combined power consumption limit by a total number of computing systems and monitor the computing systems to determine a power consumption and a performance of each computing system over a specified period of time. The instructions may also cause the computing device to adjust the power consumption limit for each computing system based on the power consumption and the performance over the specific period of time, wherein the power consumption limit for each computing device is adjusted such that differences between the performances of the computing systems are below the performance difference limit.

The instructions may cause the computing device to operate each computing system in each of a number of performance states, wherein each performance state comprises a performance and a maximum power consumption, and collect data relating to a power consumption and a performance of each computing system in each performance state. The instructions may also cause the computing device to build a table including measured performance states based on the data, wherein each of the measured performance states includes an average performance and an average power consumption. Further, the instructions may cause the computing device to use the table to determine the power consumption limit for each computing system, wherein the power consumption limit is determined such that the differences between the performances are below the performance difference limit. It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for managing power consumption and performance of computing systems, comprising:
    monitoring an overall power consumption of the computing systems to determine whether the overall power consumption is above or below an overall power consumption limit for a particular workload, wherein the overall power consumption is based on, at least in part, and socket level power consumption and each computing system comprises a node management agent chassis that is to determine a corresponding socket level power consumption limit;
    monitoring a performance of each computing system to determine whether a performance of each computing system is within a performance tolerance, wherein the performance is a response of the computing systems during and after execution of the particular workload, and wherein the response is a number of transactions completed; and
    adjusting power consumption limits for the computing systems or performances of the computing systems such that the overall power consumption of the computing systems is below the overall power consumption limit and the performance of each computing system is within the performance tolerance.

2. The method of claim 1, wherein the method is executed via a data center management agent within a remote computing system.

3. The method of claim 2, comprising sending the power consumption limit for a computing system from the data center management agent within the remote computing system to a node management agent within the computing system, the node management agent being configured to maintain a power consumption of the computing system below the power consumption limit and a performance of the computing system within the performance tolerance.

4. The method of claim 1, wherein the computing systems comprise homogeneous computing systems with an identical hardware configuration and an identical software configuration.

5. The method of claim 4, comprising uniformly adjusting performances of the computing systems such that the computing systems are operating at an identical performance and the overall power consumption is below the overall power consumption limit.

6. The method of claim 4, comprising:
periodically monitoring the overall power consumption of the computing systems;
in response to determining that the overall power consumption exceeds an upper threshold power consumption, decreasing the performances of the computing systems such that the overall power consumption is below the upper threshold power consumption; and
in response to determining that the overall power consumption is below a lower threshold power consumption, increasing the performances of the computing systems such that the overall power consumption is above the lower threshold power consumption.

7. The method of claim 4, comprising:
determining a performance and a maximum power consumption for each performance state of a device within the computing systems from an Advanced Configuration and Power Interface (ACPI) performance state table; and
determining a target performance state for the computing systems based on the performance and the maximum power consumption for each performance state, wherein the target performance state is determined such that the overall power consumption is below the overall power consumption limit and the performances of the computing systems are within the performance tolerance.

8. The method of claim 4, comprising:
determining a power consumption limit for each computing system by dividing the overall power consumption limit by a total number of computing systems;
monitoring the computing systems to determine a power consumption and a performance of each computing system over a specified period of time; and
adjusting the power consumption limit for each computing system based on the power consumption and the performance over the specific period of time, wherein the power consumption limit for each computing device is adjusted such that performances of the computing systems are maintained within the performance tolerance.

9. The method of claim 4, comprising:
operating the computing systems at a uniform power consumption;
monitoring the computing systems to determine a performance of each computing system over a specified period of time;
determining a specified number of computing systems with highest performances;
powering down each computing system that is not within the specified number of computing systems with the highest performances; and
adjusting the power consumption limit for each of the specified number of computing systems based on the performance of each computing system over the specific period of time.

10. The method of claim 4, comprising:
operating the computing systems at a uniform performance;
monitoring the computing systems to determine a power consumption of each computing system over a specified period of time;
determining a specified number of computing systems with lowest power consumptions;
powering down each computing system that is not within the specified number of computing systems with the lowest power consumptions; and
adjusting a performance of each of the specified number of computing systems based on the power consumption of each computing system over the specific period of time.

11. The method of claim 1, comprising:
operating each computing system in each of a plurality of performance states, wherein each performance state comprises a performance and a maximum power consumption;
collecting data relating to a power consumption and a performance of each computing system in each performance state;
building a table comprising measured performance states based on the data, wherein each of the measured performance states comprises an average performance and an average power consumption; and
using the table to determine the power consumption limit for each computing system, wherein the power consumption limit is determined such that the performance of the computing system is within the performance tolerance.

12. The method of claim 1, comprising:
monitoring a power consumption of each computing system and a time when each computing system reaches a specific boundary condition;
increasing power consumption limits for a subset of the computing systems that reach the specific boundary condition in a slowest time period; and
decreasing power consumption limits for a remaining number of the computing systems that reach the specific boundary condition in a fastest time period.

13. A system for managing power consumption and performance of computing systems, comprising:
a data center management system, wherein the data management system is a computing device configured to determine a platform level power consumption limit for each of a plurality of computing systems in a data center for a particular workload based on an overall power consumption limit and a performance tolerance for the plurality of computing systems, wherein the performance tolerance is based, in part, on a response of the plurality of computing systems during and after execution of the particular workload; and
the plurality of computing systems, wherein each computing system comprises:
a node management agent, wherein the node management agent is a chassis comprising multiple blades that is configured to maintain a platform level power consumption of the computing system below the platform level power consumption limit by determining a socket level power consumption limit for each socket within a platform of the computing system; and
a plurality of component management agents, wherein each component management agent is configured to maintain the socket level power consumption limit for a corresponding socket within the computing system, the component management agent comprising control hardware that is a part of a central processing unit.

14. The system of claim 13, wherein the performance tolerance comprises a specified maximum difference in performances between the plurality of computing systems.

15. The system of claim 13, wherein the plurality of computing systems comprises homogeneous computing systems with an identical hardware configuration and an identical software configuration.

16. The system of claim 15, wherein the data center management system is configured to:
   determine a performance and a maximum power consumption for each performance state of a device within the computing systems from an Advanced Configuration and Power Interface (ACPI) performance state table; and
   determine a target performance state for the computing systems based on the performance and the maximum power consumption for each performance state, wherein the target performance state is determined such that the overall power consumption is below the overall power consumption limit and the performances of the computing systems are within the performance tolerance.

17. The system of claim 15, wherein the data center management system is configured to:
   determine a power consumption limit for each computing system by dividing the overall power consumption limit by a total number of computing systems;
   monitor the computing systems to determine a power consumption and a performance of each computing system over a specified period of time; and
   adjust the power consumption limit for each computing system based on the power consumption and the performance over the specific period of time, wherein the power consumption limit for each computing device is adjusted such that performances of the computing systems are maintained within the performance tolerance.

18. The system of claim 13, wherein the data center management system is configured to:
   operate each computing system in each of a plurality of performance states, wherein each performance state comprises a performance and a maximum power consumption;
   collect data relating to a power consumption and a performance of each computing system in each performance state;
   build a table comprising measured performance states based on the data, wherein each of the measured performance states comprises an average performance and an average power consumption; and
   use the table to determine the power consumption limit for each computing system, wherein the power consumption limit is determined such that the performance of the computing system is within the performance tolerance.

19. The system of claim 13, wherein the data center management system is configured to adjust the platform level power consumption limit for each of the plurality of computing systems such that an overall power consumption of the plurality of computing systems is less than the overall power consumption limit and performances of the plurality of computing systems are within the performance tolerance.

20. At least one non-transitory machine readable medium having instructions stored therein that, in response to being executed on a computing device, cause the computing device to:
   monitor a combined power consumption of the computing systems to determine whether the combined power consumption is above or below a combined power consumption limit for a particular workload, wherein the overall power consumption is based on, at least in part, and socket level power consumption and each computing system comprises a node management agent chassis that is to determine a corresponding socket level power consumption limit;
   monitor differences between performances of the computing systems to determine whether the differences are above or below a performance difference limit, wherein the performance is a response of the computing systems during and after execution of the particular workload; and
   adjust power consumption limits for the computing systems or performances of the computing systems such that the combined power consumption is below the combined power consumption limit and the differences between the performances are below the performance difference limit.

21. The at least one non-transitory machine readable medium of claim 20, wherein the computing system comprise homogeneous computing systems with an identical hardware configuration and an identical software configuration.

22. The at least one non-transitory machine readable medium of claim 21, wherein the instructions cause the computing device to:
   determine a performance and a maximum power consumption for each performance state of a device within the computing systems from an Advanced Configuration and Power Interface (ACPI) performance state table; and
   determine a target performance state for the computing systems based on the performance and the maximum power consumption for each performance state, wherein the target performance state is determined such that the combined power consumption is below the combined power consumption limit and the differences between the performances are below the performance difference limit.

23. The at least one non-transitory machine readable medium of claim 21, wherein the instructions cause the computing device to:
   determine a power consumption limit for each computing system by dividing the combined power consumption limit by a total number of computing systems;
   monitor the computing systems to determine a power consumption and a performance of each computing system over a specified period of time; and
   adjust the power consumption limit for each computing system based on the power consumption and the performance over the specific period of time, wherein the power consumption limit for each computing device is adjusted such that differences between the performances of the computing systems are below the performance difference limit.

24. The at least one non-transitory machine readable medium of claim 20, wherein the instructions cause the computing device to:

operate each computing system in each of a plurality of performance states, wherein each performance state comprises a performance and a maximum power consumption;

collect data relating to a power consumption and a performance of each computing system in each performance state;

build a table comprising measured performance states based on the data, wherein each of the measured performance states comprises an average performance and an average power consumption; and use the table to determine the power consumption limit for each computing system, wherein the power consumption limit is determined such that the differences between the performances are below the performance difference limit.

* * * * *